(12) United States Patent
McGowan

(10) Patent No.: US 7,209,470 B2
(45) Date of Patent: Apr. 24, 2007

(54) METHOD AND APPARATUS FOR ENCAPSULATING UNIVERSAL SERIAL BUS MESSAGING OVER LINK LAYER COMMUNICATION PROTOCOL

(75) Inventor: Steve B. McGowan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1067 days.

(21) Appl. No.: 09/811,111

(22) Filed: Mar. 16, 2001

(65) Prior Publication Data

US 2002/0167932 A1    Nov. 14, 2002

(51) Int. Cl.
*H04J 3/24*    (2006.01)
*H04J 3/22*    (2006.01)
*H04B 7/00*    (2006.01)

(52) U.S. Cl. ............ 370/349; 370/466; 370/469; 455/41.2

(58) Field of Classification Search ........ 370/464–467, 370/469, 474–475, 358, 349, 392, 393, 338; 455/39, 41.2; 709/208, 230, 217–219
See application file for complete search history.

(56) References Cited

U.S. PATENT DOCUMENTS

| | | | |
|---|---|---|---|
| 6,519,290 B1 * | 2/2003 | Green | 375/259 |
| 6,633,583 B1 * | 10/2003 | Esterson | 370/466 |
| 6,633,759 B1 * | 10/2003 | Kobayashi | 455/419 |
| 6,687,774 B2 * | 2/2004 | Milios et al. | 710/72 |
| 6,782,245 B1 * | 8/2004 | Lazzarotto et al. | 455/226.1 |
| 6,842,611 B2 * | 1/2005 | Beck et al. | 455/414.1 |
| 2002/0151275 A1 * | 10/2002 | Trost et al. | 455/41 |

\* cited by examiner

*Primary Examiner*—Chi Pham
*Assistant Examiner*—Tri H. Phan
(74) *Attorney, Agent, or Firm*—Kenyon & Kenyon LLP

(57) ABSTRACT

A method and apparatus for encapsulating universal serial bus (USB) messaging over a link layer communication protocol is disclosed. In an embodiment of the present invention, the human interface device (HID) protocol is encapsulated in Bluetooth baseband protocol for wireless transmission between a peripheral device and a host computer.

25 Claims, 5 Drawing Sheets

Bluetooth Transfer Between Host and HID Device

METHOD AND APPARATUS FOR ENCAPSULATING UNIVERSAL SERIAL BUS MESSAGING OVER LINK LAYER COMMUNICATION PROTOCOL

BACKGROUND INFORMATION

There are currently different methods in the art for transmitting data between a host computer and peripheral devices. An emerging standard for the transmission of data along an external bus is known as USB, which stands for Universal Serial Bus (USB Rev. 1.1; USB Implementors Forum, Inc.). USB is being utilized more and more frequently due to its ability for high data transfer rates (12 million bits per second) and for its flexibility ('plug-and-play' and 'hot plugging' ability, in addition to capacity to connect up to 127 peripheral devices).

The standard of HID (Human Interface Device) (HID Version 1.1; USB Standards Group) was designed as a USB protocol for the operation of devices such as keyboards, mice, and game controllers. With the utilization of the HID protocol over USB, as it exists in the art, a limitation is placed on the distance a peripheral device can be from the host computer as well as its mobility. This limitation is created by the USB cabling that exists between the peripheral device and the host computer.

A method exists for linking one or more peripheral devices to a host computer via an infrared (IR) link. Problems can arise with the IR transmission due to obstacles in the IR transmission pathway. An example involves the utilization of a wireless keyboard with an IR link to the host computer. Because IR signal transmission is based on the sending and receiving of light waves, a link to the host computer can only be maintained while there is a clear line of sight between the IR sending unit and receiving unit. If, for example, the operator of the keyboard is sitting on a couch with his legs crossed as the keyboard rests in his lap, the IR signal can be blocked by the back of the operator's leg, thus preventing reliable operation. Even with an IR-linked keyboard or mouse placed on an operator's desktop near the host computer, an item on the desktop placed between the computer and the peripheral device could interrupt transmission.

Another example involves the operation of a wireless game controller that communicates with a game console via IR signal transmission. Often, children utilize exaggerated movements in the operation of controllers during game play. Inadvertent body movements (usually in the direction desired for the game character) is common. During the periods when the game controller IR sending unit is not within a reasonable line of sight of the IR receiving unit, accurate data transmission is impossible, and thus game play is adversely effected.

Therefore, a need exists for a method to send and receive HID protocol data transmissions over a wireless media, which is not dependent upon line-of-sight clarity.

DETAILED DESCRIPTION

In order to avoid the aforementioned problems with wireless transmission of USB-protocol data via IR, a method is disclosed for wireless transmission via a wireless protocol such as the Bluetooth protocol. According to an embodiment of the present invention, a data packet encoded under a USB protocol, such as HID, is encapsulated within one or more Bluetooth baseband packets and is transmitted via a wireless medium under the Bluetooth protocol (Version 1.0, 1999 Bluetooth Special Interest Group). Utilizing RF (radio frequency) transmission, the need for line-of-site clarity (access) is eliminated, and thus device mobility and flexibility of device placement are improved.

Figure 1:
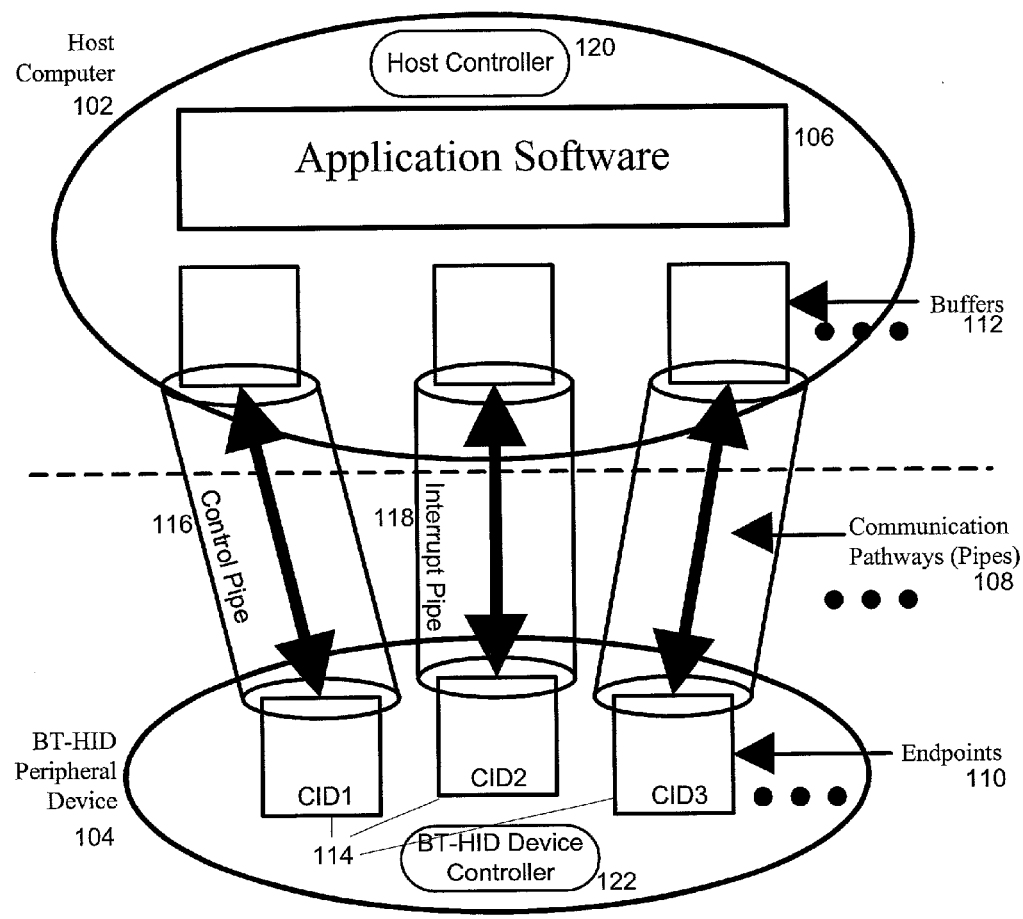
FIG. 1 illustrates the communication flow between a host computer and a peripheral device according to an embodiment of the present invention.

FIG. 1 illustrates the communication flow between a host computer 102 and a peripheral device 104 according to an embodiment of the present invention. In this embodiment, a Bluetooth/HID protocol (BT-HID) provides a communication service between application software 106 and system software executed at a host computer and a peripheral device (BT-HID) device 104. The BT-HID device 104 can have different communication flow requirements for different application-to-device interactions. In this embodiment of the invention, good overall bus utilization is provided by allowing the separation of the different communication pathways 108 to a BT-HID device 104. Each communication pathway (or Pipe) 108 makes use of some bus access to accomplish communication between the application 106 and device 104. Each pipe 108 is terminated at a logical channel endpoint 110 on the BT-HID device 104 at one end and a buffer 112 on the host 102 at the other end. Information associated with an endpoint 110 is used to identify the characteristics of the respective pipe 108. Channel IDs (CIDs) 114 are used to identify endpoints 110.

In an embodiment of the present invention, an HID device 104 appears to the system as a collection of endpoints 110. System software executed at host computer 102 manages the device using the Control Pipe 116. Application software 106 manages the device using the Interrupt Pipe 118 and the Control Pipe 116. Application software 106 requests that data be moved across the Bluetooth transmission between a buffer on the host 102 and an endpoint 110 on the BT-HID device 104. The host controller 120 (or BT-HID device controller 122 depending on transfer direction) packetizes the data to move it over the air. The host controller 120 also coordinates bus access to enable transferring the packet of data over the air.

In an embodiment of the present invention, BT-HID devices 104 support at least two types of pipes: Interrupt 118 and Control 116. HID Interrupt pipes 118 are to provide guaranteed delivery of data and guaranteed bandwidth. The guaranteed bandwidth ensures low latency for the interrupt data. In this embodiment, control pipes 116 provide guaranteed delivery of data, however there are no latency guarantees.

In one embodiment of the present invention, BT-HID devices 104 support up to 4 data transfer types: Input, Output, Feature, and Control. Each of these transfer types is associated with a specific Endpoint 110 on the device. Using SDP (System Discovery Protocol), a host 102 may identify the endpoints 110 supported by a device 104. Feature and Control data transfer type support may be required for all BT-HID devices 104, while Input and Output data transfer type support may be optional.

In this embodiment, Feature and Control transfers do not specify any latency requirements, but do carry application-specific data. Control transfers are used for initialization and generic BT-HID device 104 control. Feature and Control requests and data are always transferred over the Control Pipe 116 in this embodiment. Since all HID devices 104 support a Control Pipe 116, the endpoint 110 associated to it is not declared by SDP service attributes. HID devices 104 only support one Control Pipe 116 and that pipe 108 is always tied to the default logical channel (CID=0x0040) 114. The Control Pipe 116 may be referred to as the "Default" pipe, and supports bidirectional transfers.

Input transfers provide low latency delivery of asynchronous information from the device 104 to the host 102. In an embodiment, the device 104 declares the maximum latency that it wishes to see, and the host 102 polls the device at a rate that will meet the expected latency requirement. The input transfers flow over an Interrupt pipe 118, which is terminated at an 'Interrupt In' endpoint 110.

Output transfers provide low latency delivery of information from the host 102 to the device 104. The device 104 declares the maximum rate at which it can accept consecutive output transfers, and the host 102 is expected to generate transfers at this rate, or provide the best approximation without exceeding it. The output transfers flow over an Interrupt pipe 118, which is terminated at an Interrupt Out endpoint 110.

The CID 114 for the Interrupt In and Out endpoints 110 can be allocated in a manner that is best suited for that particular implementation, with the following provisions: 1) The same CID 114 is not re-used as a local L2CAP (logical link control and adaptation protocol; part of the Bluetooth specification) channel endpoint 110 for multiple simultaneous L2CAP channels between a local device and some remote device. 2) CIDs 114 is between the values of 0x0041 and 0xFFFF. CIDs 114 between 0 and 0x003F are reserved by the L2CAP spec and 0x0040 are permanently allocated to the HID Control Pipe (See Table 1).

TABLE 1

CID Definitions

| CID | Description |
|---|---|
| 0x0000–0x003F | Reserved by L2CAP Specification |
| 0x0040 | HID Control Pipe |
| 0x0041–0xFFFF | Available for HID Interrupt Pipe allocation |

Figure 2:
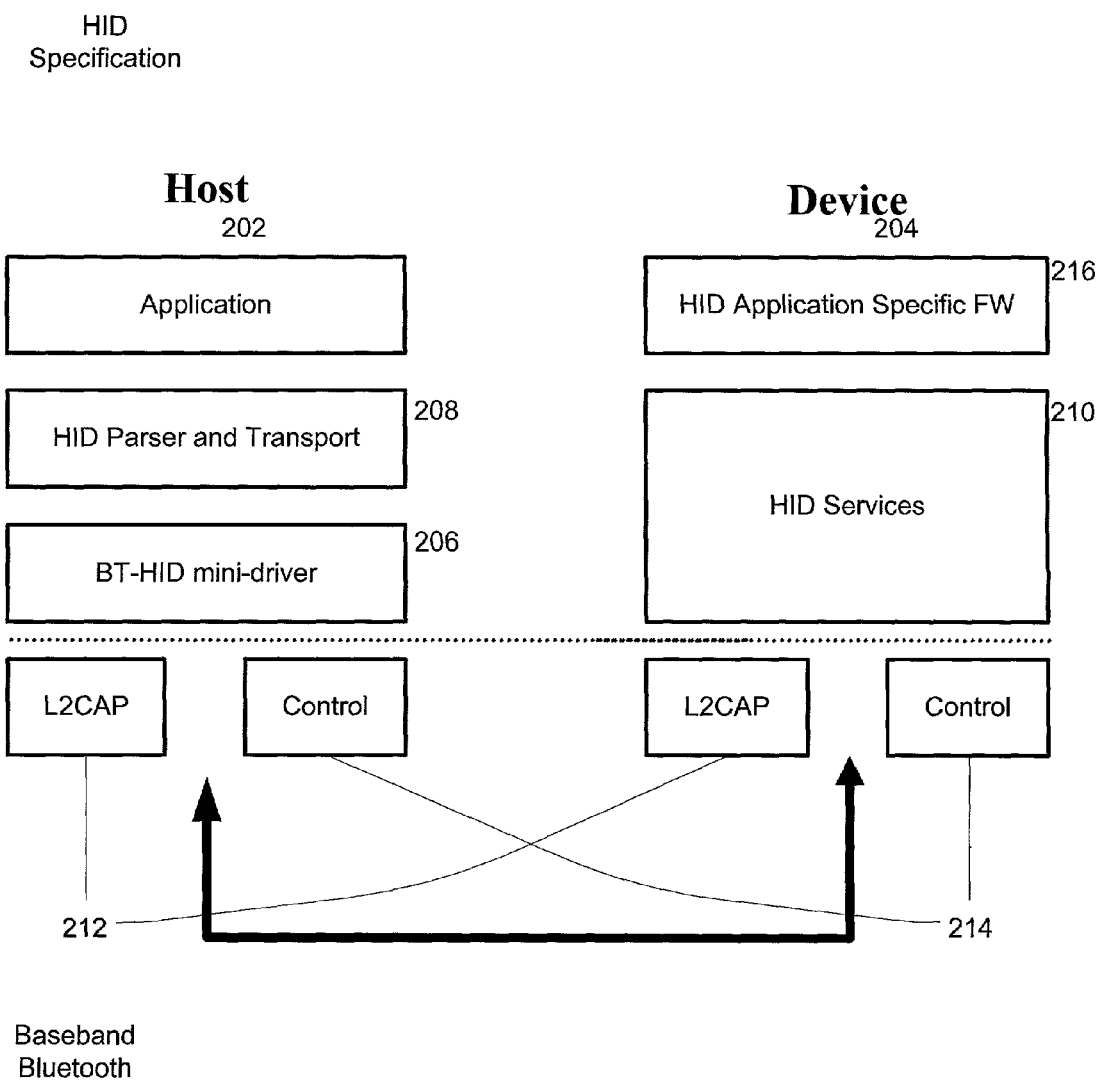
FIG. 2 illustrates how payloads are translated between the data defined by the HID specification and the baseband Bluetooth packets and back according to an embodiment of the present invention.

FIG. 2 illustrates an example of how payloads are translated between the data defined by the HID specification (top layer) and the baseband Bluetooth packets (bottom layer) and back. In an embodiment of the present invention, a BT-HID mini-driver 206 adapts the standard HID Parser and Transport 208 provided by an operating system to the Bluetooth stack 212, 214. On the device 204 side, a generic HID Services module 210 provides the services required by any BT-HID implementation. HID Services 210 communicates through the L2CAP 212 and standard Bluetooth Control 214 interfaces. In this embodiment, the Application-Specific firmware 216 of a BT-HID device communicates with the HID Services 210, and provides the following functions: Enumeration; Authentication; Connection State Management; Segmentation and Reassembly (SAR); Packetization; and Scheduling.

In one embodiment of the present invention, BT-HID devices use the L2CAP 212 services defined by Bluetooth. In particular, BT-HID devices take advantage of the SAR, and reliable data delivery that L2CAP 212 provides.

HID devices as defined by the USB Human Interface Device class document handle "Standard" and "Class Specific" requests. In one embodiment, all BT-HID devices support Standard requests, and allow the host to query or change the status of the device, retrieve static data structures, or switch the operational mode of the device. Class Specific requests depend on the specific application that the BT-HID device is targeted at: mouse, keyboard, etc. In this embodiment, the format for Standard and Class Specific requests is the same, a request packet sent by the host, followed by either data from the host or data from the device. The format of the requests and their associated data or reports are defined in the USB Human Interface Device class specification.

Figure 3:
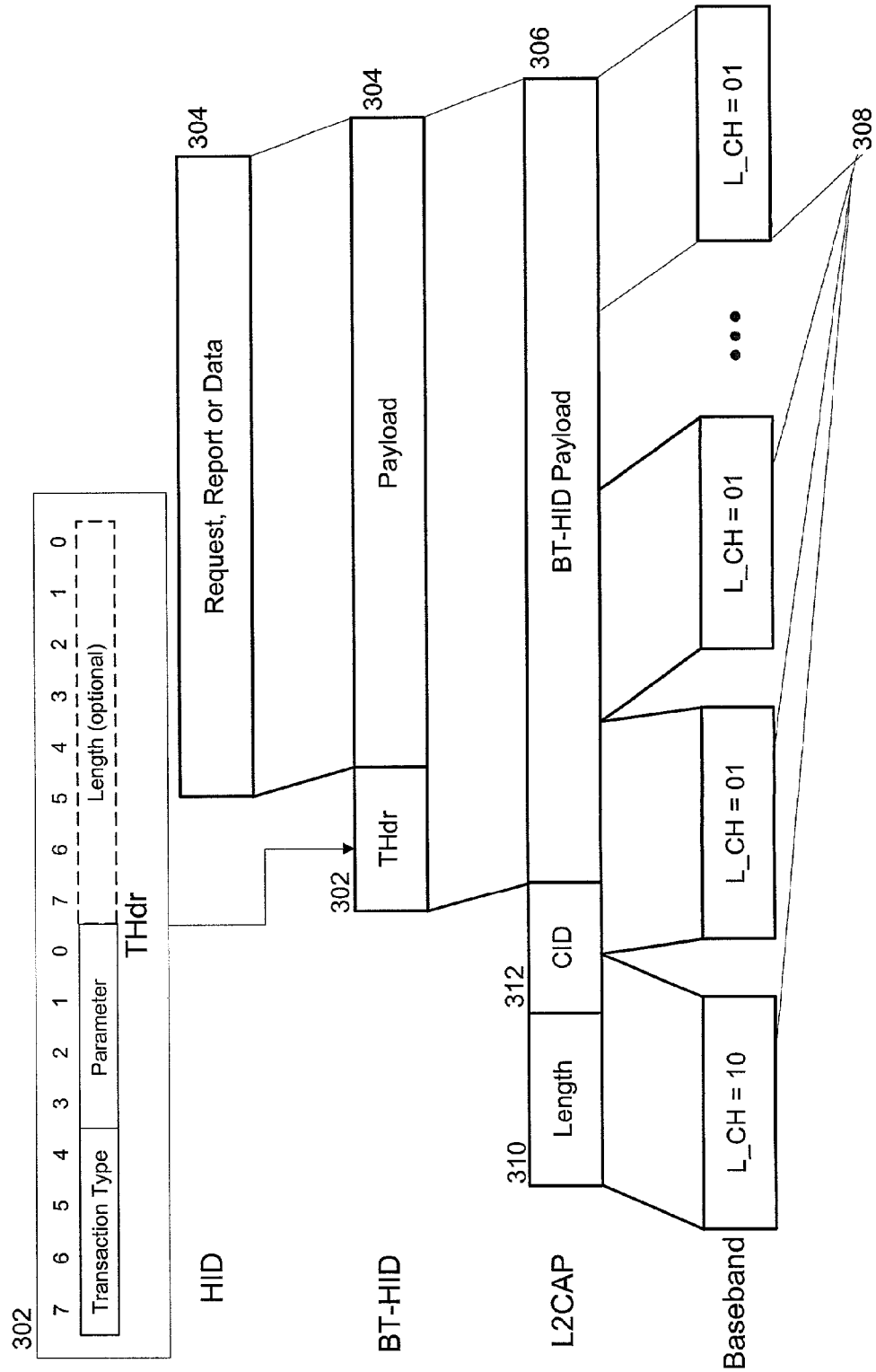
FIG. 3 illustrates the conversion of an HID data packet to one or more Bluetooth (BT) baseband data packets according to an embodiment of the present invention.

FIG. 3 illustrates the conversion of an HID data packet 304 to one or more Bluetooth baseband data packets 308. In one embodiment, a BT-HID device adds a header (also called the Transaction Header—THdr) 302 to the HID payload 304. A THdr 302 can vary in length from 1 to 3 bytes. The first byte of header 302 identifies the Transaction Type (TT) associated with the transaction.

In one embodiment, L2CAP adds another layer of encapsulation, defined by the Bluetooth Specification. In this L2CAP packet, the length 310 and the CID 312 is provided in the header. If the payload 306 resulting from the first (BT-HID) encapsulation is too large to fit in a single baseband packet 308, the L2CAP layer will segment the payload 306 into smaller blocks 308 before transmission or assemble segmented received packets into an L2CAP packet.

As stated, in an embodiment, all messages between an HID device and a host are preceded by a BT-HID Transaction Header (THdr) 302. In an embodiment, the Transaction Header 302 is divided into two (or more) fields: the transaction type and a transaction parameter (Also, a 'length' field can be added). The transaction parameter may be transaction type dependent.

Table 2 lists the supported Transaction Types in one embodiment of the present invention:

TABLE 2

BT-HID Transaction Type Codes

| Hex | Transaction Type | Data Length | Group |
|---|---|---|---|
| 0 | NULL (No Command) | | N/A |
| 1 | HID-Control | 2 | Control |
| 2–3 | Reserved | | |
| 4 | REQ | 8 | Setup |
| 5 | ROUT | 8 +wLength | Setup & Data |
| 6–7 | Reserved | | |
| 8 | DATA | Length determined by the transaction parameter | Data |
| 9–A | Reserved | | |
| B | DATC | Determined by DATA | |
| C | HANDSHAKE | 0 | Handshake |
| D–F | Reserved | | |

Table 3 lists the supported parameters in one embodiment of the present invention:

TABLE 3

DATA Parameter Definition

| Parameter Value | Function | Description |
|---|---|---|
| 0 | NOP | No operation. |
| 1 | Hard Reset | Device performs Power On System Test (POST) then initializes all internal variables and initiates normal operations. |
| 2 | Soft Reset | Device initializes all internal variables and initiates normal operations. |
| 3 | Suspend | Go to reduced power mode. |
| 4–15 | | Reserved |

There are various codes implemented in one embodiment of the present invention:

HID-Control (TT Code 0x1)

In one embodiment, this code requests a device to return to its initial state.

REQ (TT Code 0x4)

In one embodiment, this code is used for control reads from the BT-HID device. An 8-byte HID Request block (See Table 4) immediately follows the REQ header, which requests the operation to be preformed. Bit 7 of bmRequestType is always 1 (Device to Host). The wLength field identifies the maximum size of the data payload to be returned by the device.

TABLE 4

HID Request Block

| Field | Offset/Size (Bytes) | Description |
|---|---|---|
| bmRequestType | 0/1 | Bits specifying characteristics of request. |
| | | 7    Data transfer direction |
| | |        0 = Host to device |
| | |        1 = Device to host |
| | | 6..5  Type |
| | |        0 = Standard |
| | |        1 = Class |
| | |        2 = Vendor |
| | |        3 = Reserved |
| | | 4..0  Reserved (since BT-HID devices have no concept of Device, Interface, and Endpoint recipients, as defined in the HID spec.) |
| bRequest | 1/1 | Specific Request (assigned by HID Specification) |
| wValue | 2/2 | Numeric expression specifying word-size field (varies according to request.) |
| wIndex | 4/2 | Index or offset specifying word-size field (varies according to request.) |
| wLength | 6/2 | Number of bytes to transfer if there is a data phase |

In one embodiment of the present invention, BT-HID devices support a subset of the Standard requests defined in the HID specification. Requests not appropriate for BT-HID devices are marked as reserved in Table 5. BT-HID devices do not support GET CONFIGURATION and GET INTERFACE requests. Table 5 lists the supported Standard requests:

TABLE 5

Standard HID Requests (REQ)

| bRequest Value | Description | wLength |
|---|---|---|
| 0x00 | GET_STATUS | 2 |
| 0x01–0x05 | Reserved | |
| 0x06 | GET_DESCRIPTOR | Size of receive buffer |
| 0x07–0xFF | Reserved | |

In this embodiment, the GET_STATUS request is mandatory and is supported by all BT-HID devices. The GET_DESCRIPTOR request is optional for BT-HID devices in this embodiment.

In one embodiment, BT-HID devices support a subset of the Class Specific requests defined in the HID specification. In Table 6, requests not appropriate for BT-HID devices are marked as reserved (e.g., BT-HID devices do not support GET IDLE requests). Table 6 lists the supported Class Specific requests of this embodiment:

TABLE 6

Class Specific HID Requests (REQ)

| bRequest Value | Description | wLength |
|---|---|---|
| 0x00 | Reserved | |
| 0x01 | GET_REPORT | Size of receive buffer |
| 0x02 | Reserved | |
| 0x03 | GET_PROTOCOL | 1 |
| 0x04–0xFF | Reserved | |

The GET_REPORT request is mandatory in this embodiment and is supported by all BT-HID devices. The GET_PROTOCOL request is required only for boot devices in this embodiment. In one embodiment, all Parameter values (0–15) are reserved.

ROUT (TT Code 0x5)

In one embodiment, this code is used for control writes to the BT-HID device. The ROUT header is always followed by an 8-byte HID Request Block (See Table 4). Depending on the request, a data payload may immediately follow the Request Block. Bit 7 of bmRequestType is always 0 (Host to Device). wLength identifies the number of data bytes to be written.

In one embodiment, BT-HID devices support a subset of the Standard requests defined in the HID specification. In Table 7, requests not appropriate for BT-HID devices are marked as reserved (e.g., BT-HID devices do not support SET CONFIGURATION and SET INTERFACE requests). Table 7 lists the supported Standard requests in this embodiment:

TABLE 7

Standard HID Requests (ROUT)

| bRequest Value | Description | wLength |
|---|---|---|
| 0x00 | Reserved | |
| 0x01 | CLEAR_FEATURE | 0 |
| 0x02 | Reserved | |
| 0x03 | SET_FEATURE | 0 |
| 0x04–0x06 | Reserved | |
| 0x07 | SET_DESCRIPTOR | Size of descriptor |
| 0x08–0xFF | Reserved | |

The CLEAR_FEATURE and SET_FEATURE requests are mandatory and are supported by all BT-HID devices. The SET_DESCRIPTOR request is optional for BT-HID devices in this embodiment.

In one embodiment, BT-HID devices support a subset of the Class Specific requests defined in the HID specification. In Table 8, requests not appropriate for BT-HID devices are marked as reserved (e.g., BT-HID devices do not support SET IDLE requests). Table 8 lists the supported Class Specific requests in this embodiment:

TABLE 8

Class Specific HID Requests (ROUT)

| bRequest Value | Description | wLength |
| --- | --- | --- |
| 0x00–0x08 | Reserved | |
| 0x09 | SET_REPORT | Size of Report |
| 0x0A | Reserved | |
| 0x0B | SET_PROTOCOL | 0 |
| 0x04–0xFF | Reserved | |

The SET_PROTOCOL request is required only for boot devices in this embodiment. In one embodiment, all Parameter values (0–15) are reserved.

DATA (TT Code 0x8)

Data—In one embodiment, this code identifies an HID payload. The size of the payload is identified by the parameter.

In one embodiment, the DATA parameter field has encoding shown in Table 9:

TABLE 9

DATA Parameter Definition

| Parameter Value | Description | Header Length (Bytes) | Minimum Payload Size (Bytes) | Maximum Payload Size (Bytes) |
| --- | --- | --- | --- | --- |
| 0–13 | Payload size | 1 | 0 | 13 |
| 14 | 8-bit Length field follows | 2 | 14 | 255 |
| 15 | 16-bit Length field follows | 3 | 256 | 65535 |

DATC (TT Code 0xA)

Data Continue—In one embodiment, this code indicates the continuation of a DATL or DATS. DATC payloads are concatenated to DATL or DATS payloads until LENGTH data bytes are accumulated.

In one embodiment, all Parameter values (0–15) are reserved.

HANDSHAKE (TT Code 0xC)

In one embodiment, this code is used to acknowledge requests. The Parameter field the result of the handshake. The handshake parameter definition is shown in Table 10:

TABLE 10

HANDSHAKE Parameter Definition

| Parameter Value | Result | Description |
| --- | --- | --- |
| 0 | ACK | This code is used to acknowledge requests. A device that has correctly received a REQ frame, transmits a request acknowledgment to the host. The device must be ready to accept any Data associated with the request. |
| 1 | NAK | This code has a meaning similar to a NAK in the USB protocol. It does not mean "Negative Acknowledge"in the traditional communication sense. If a device is too busy to accept data, it will send a NAK. |
| 2 | STALL | This code is sent from a device to a host, and means that a host request cannot be honored. Typically due to an inability to parse the request. The HID host uses the CLEAR_FEATURE(STALL) request to clear a stalled endpoint. |
| 3–15 | | Reserved |

Figure 4:
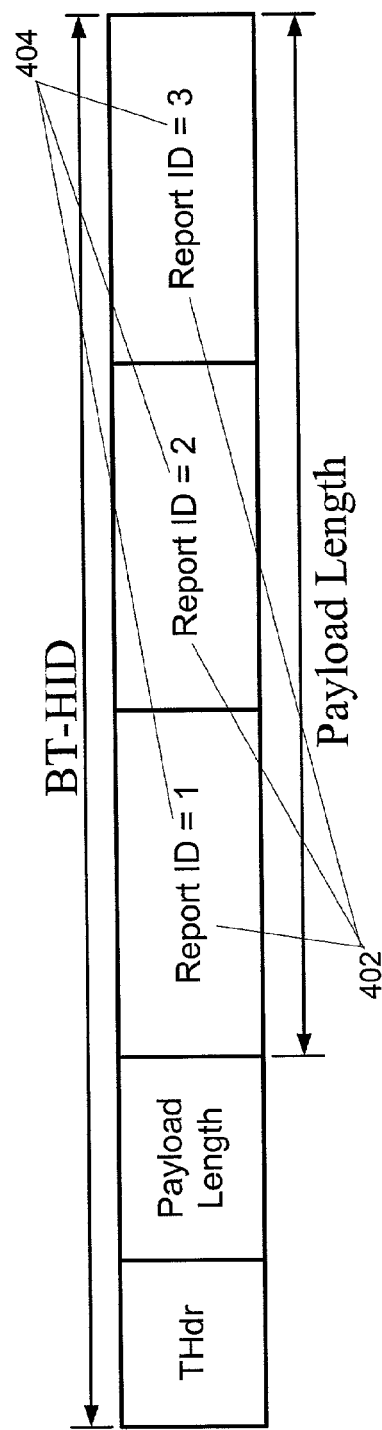
FIG. 4 illustrates the concatenation of the BT-HID payload according to an embodiment of the present invention.

FIG. 4 illustrates the concatenation of the BT-HID payload according to an embodiment of the present invention. In the following discussion the term, 'Host' refers to the software stack on the host that supports BT-HID devices.

Maximum Transmission Unit

The Bluetooth specification defines the minimum value for the Maximum Transmission Unit (MTU) of connection oriented devices (MTUcno) to be 48 bytes. HID hosts are required to provide support for the default minimum MTU of 672 bytes. In an embodiment of the present invention, if a report 402 defined by a device is larger than 672 bytes, then the HID device implements segmentation and reassembly (SAR) capabilities. HID hosts are required to support SAR for payloads greater than MTU in size.

Report Data

In an embodiment of the present invention, the Input and Output reports 402 are designed to be 15 bytes or less in size for BT-HID devices. The 15 byte payload size is determined by the 17 byte User Payload size of a DM1 packet. The 17-byte DM1 payload includes 2 bytes for the BT-HID DATS transaction header, and 15 bytes of BT-HID interrupt payload. DH1 packets are also single RX/TX cycle packets, supporting a 27-byte payload. In this embodiment, DH1 packets do not contain Forward Error Correction (FEC). FEC may be optionally enabled by the radio, so as to ensure that BT-HID packets are contained in a single slot DM1 packets. This payload size minimizes latency and maximizes the number of BT-HID devices that can be supported by ensuring that no more than one RX/TX (Receive/Transmit) cycle will be used to move a report.

Report Concatenation

In an embodiment of the present invention, multiple reports can be concatenated into a single L2CAP payload on interrupt pipes. HID host implementations can read the HIDReportList attributes to determine the size of individual reports.

In an embodiment, if the device supports Report IDs 404, then the HID mini-driver will look at the Report ID 404 (the first byte of the report), and copy the number of bytes identified in the HIDReportList or the remaining data in the payload, whichever is less, to the HID driver. This process continues until there is no more data. The device can use the same approach to distinguish concatenated Output reports.

If Report IDs are not used then at most, one set of Report ID/Length attributes will be declared for each report type and the Report ID will equal 0.

SAR

A minimum MTU is not guaranteed in this embodiment of the invention. A BT-HID device supports Segmentation and Reassembly (SAR) of up to MTU sized data payloads in this embodiment. The following mechanism may be employed: Hosts are required to support SAR capabilities for HID devices. In this case, the SAR module must determine the MTU negotiated between the master and the slave (e.g., using a L2CAP_GetInfo service).

Segmentation

In an embodiment, the HID SAR module divides data into segments less than or equal to the L2CAP layer's negotiated MTUcno limit, before sending them to the L2CAP layer. This implies that the HID payload field has a limit of MTUcno—sizeof(THdr) bytes, i.e., excluding the 3 bytes for a connection management header. The first segment will contain a DATA header and all subsequent segments will contain a DATC header. The length defined by the DATA header will identify the total payload size not including any DATC headers.

Reassembly

In an embodiment, if the payload received by the HID SAR module is less than the size identified by a REQ or DATA header, it will concatenate all subsequent segments with DATC headers, until all of the expected payload is received. When all segments are assembled, the payload can then be passed to the upper software levels as a single large data object.

Figures 5A, 5B:
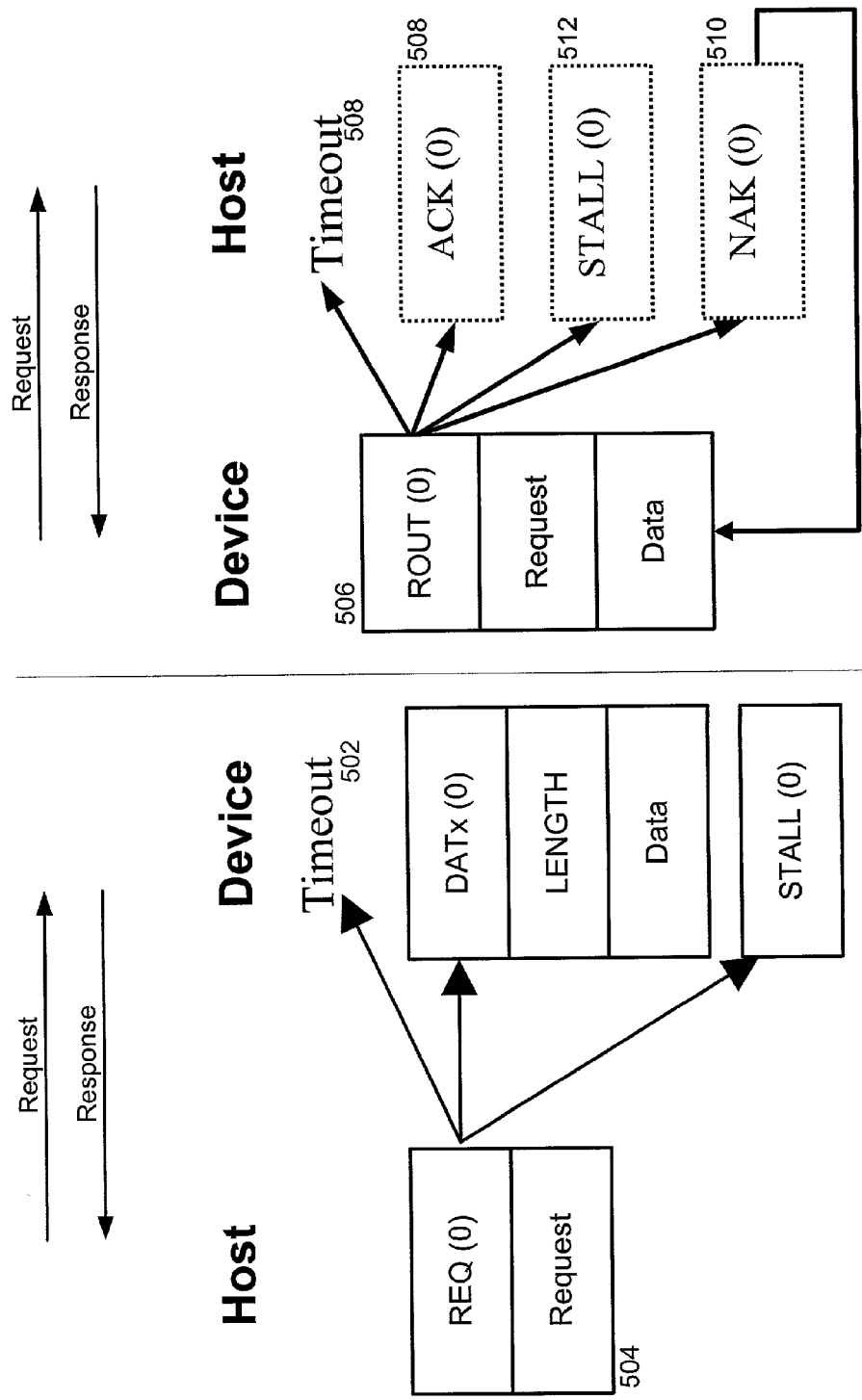
FIGS. 5a and 5b describe transfer from host to device and device to host, respectively, according to an embodiment of the present invention.

Transfers:

FIGS. 5a and 5b describe transfer from host to device and device to host, respectively, according to an embodiment of the present invention.

Control

Control transfers have two phases in this embodiment, a request by the host and a response by the device.

Timeouts

At the L2CAP level, delivery is guaranteed in this embodiment. The only error that should occur is a baseband timeout 502, which can occur on either the request 504 by the host or the response by the device. In either case, the requester would not receive a response. The timeout 502 can be due to sustained interference, an out of range condition, or the responder has been turned off. Baseband timeouts are typically 30 seconds.

To take advantage of the QoS latency feature, in an embodiment, the QoS latency is set to 10 ms. The requester will be notified if the baseband has been trying to send a message for more than 10 ms. When a baseband timeout is received, the radio has shut down the channel and one can assume that the device is either out of range or off.

Control Read

In an embodiment, for Control Read the data transfer direction is from Device to Host (bmRequestType bit 7=Device-to-Host).

Control Read request
REQ wLength=Length of request
DATA LENGTH=Actual Length of returned data As a response, the Control Read request returns the DATA or STALL (unknown request). If wLength=0 then a DIN packet with LENGTH=0 is returned as an acknowledgement.

Control Write

In an embodiment, for Control Write, the data transfer direction is from Host to Device (bmRequestType bit 7=Host-to-Device). The length of the transmitted data is identified in the wLength field of the Request packet.

In response to an ROUT 506, the device returns ACK 508 (successful request—ready for data), NAK 510 (not ready for data, retry later), or STALL 512 (don't understand request—unknown request).

L2CAP segmentation and reassembly (SAR) operations are used to improve efficiency by supporting a Maximum Transmission Unit (MTU) size larger than the largest Baseband packet. The maximum allowable MTU is 64K, however L2CAP implementations will define a smaller MTU depending on the application and the available buffering, with some implementations as small as 30 bytes. HID devices cannot depend on a minimum MTU size so they must be able to handle their own SAR operations if the negotiated MTU is smaller than the maximum data block that they can send. In an embodiment, the minimum supported MTU for connection-oriented packets ($MTU_{cno}$) is negotiated during channel configuration.

Timeouts

As stated above, at the L2CAP level, delivery is guaranteed in this embodiment. The only error that can occur is a timeout, which can occur on either the DOUT (Data Out) by the host or the DIN by the device. The timeout can be due to sustained interference or an out of range condition. In an embodiment, the BT-HID driver and device set the retry counts to a large number so that the timeout condition can always be treated to be an out of range condition.

In an embodiment, if the host detects a timeout then (assuming an out of range condition) the application will be informed. It can determine whether or not to retransmit the DOUT messages or to throw them away.

If the timeout was set to bInterval (10 ms or greater) then one would know whether a timeout occurred before attempting to send the next DOUT. Otherwise a sequence number would have to be attached to DOUTs in the driver so that it could tell which packets timed out.

Interrupt IN

To minimize latency, in an embodiment, the host always accepts interrupt data. Interrupt data is a DIN from the interrupt IN endpoint. Note, there is only one Interrupt IN (value not equal to 0) endpoint declared per HID device. In an embodiment, Interrupt IN data is dumped into a circular queue in the driver, The size of the circular queue is system dependent, where 2 is the minimum recommended size. If an application does not read the interrupt data in a timely manner, then new interrupt data overwrites old data. The device can insert the DIN in its data stream to the host at any time and should be an atomic transfer. L2CAP will ensure data integrity, so no handshake from Host is required on the DIN.

Interrupt OUT

To minimize latency, in an embodiment, the device always accepts interrupt OUT data. Where interrupt data is an OUT to the interrupt OUT endpoint. There is only one Interrupt OUT (value not equal to 0) endpoint declared per HID device in this embodiment. In this embodiment, the host can insert an interrupt DOUT in its data stream to the device at any time.

In an embodiment, either the device can handle the data at the maximum data rate or the new data overwrites the old data. The bInterval field can be used to throttle the Interrupt OUT Data. L2CAP will ensure data integrity, so no handshake from Device is required on the DOUT.

Although several embodiments are specifically illustrated and described herein, it will be appreciated that modifications and variations of the present invention are covered by the above teachings and within the purview of the appended claims without departing from the spirit and intended scope of the invention.

The invention claimed is:

1. A system for communication between a host device and a peripheral device comprising:
   the peripheral device to encode data and the host device to decode data under a Universal Serial Bus (USB) protocol to form a USB packet;
   wherein:
      the USB packet is encoded using a Bluetooth protocol to form a Bluetooth packet for the transmission between the host device and the peripheral device wherein the USB packet is encoded using the Bluetooth protocol by adding a transaction header to the USB packet so that the USB packet is included as payload in the Bluetooth packet.

2. The system of claim 1, wherein the peripheral device is a Human Interface Device (HID).

3. The system of claim 2, wherein the USB protocol is an HID protocol.

4. The system of claim 1, wherein a channel identifier (CID) is used to identify each endpoint of one or more endpoints associated to the peripheral device.

5. The system of claim 1, wherein the Bluetooth protocol utilizes a logical link control and adaptation protocol (L2CAP) to provide segmentation and reassembly (SAR).

6. The system of claim 5, wherein the Bluetooth packet is encapsulated into a L2CAP packet of a packet size in preparation for conversion to the one or more baseband packets for Bluetooth transmission.

7. The system of claim 6, wherein the Bluetooth protocol utilizes the L2CAP to provide SAR in the conversion of the L2CAP packet to the one or more baseband packets when the packet size is too large to include the information of the L2CAP packet in one baseband packet of the one or more baseband packets.

8. The system of claim 7, wherein the Bluetooth protocol utilizes the L2CAP to provide SAR when the packet size is larger than a maximum transmission unit of each baseband packet of the one or more baseband packets.

9. The system of claim 8, wherein the one or more baseband packet is capable of being transmitted from the host to the HID and from the HID to the host.

10. The system of claim 9, wherein upon transmission from the host to the HID, the HID is capable of recognizing any among a timeout, a data signal, or a stall signal.

11. The system of claim 10, wherein upon transmission from the HID to the host, the host is capable of recognizing any among the timeout, an acknowledgement signal, a non-acknowledgement signal, or the stall signal.

12. A method for communication between a host device and a peripheral device, comprising the steps of:
   encoding data under a Universal Serial Bus (USB) protocol to form a USB packet; and
   encoding the USB packet with a Bluetooth protocol to form a Bluetooth packet for transmission between the host device and the peripheral device wherein the USB packet is encoded using the Bluetooth protocol by adding a transaction header to the USB packet so that the USB packet is included as payload in the Bluetooth packet.

13. The method of claim 12, wherein the peripheral device is a Human Interface Device (HID).

14. The method of claim 13, wherein the USB protocol is an HID protocol.

15. The method of claim 12, wherein a channel identifier (CID) is used to identify each endpoint of one or more endpoints associated to the peripheral device.

16. The method of claim 12, wherein the Bluetooth protocol utilizes a logical link control and adaptation protocol (L2CAP) to provide segmentation and reassembly (SAR).

17. The method of claim 16, wherein the Bluetooth packet is encapsulated into a L2CAP packet of a packet size in preparation for conversion to the one or more baseband packets for Bluetooth transmission.

18. The method of claim 17, wherein the USB/Bluetooth protocol utilizes the L2CAP to provide SAR in the conversion of the L2CAP packet to the one or more baseband packets when the packet size is too large to include the information of the L2CAP packet in one baseband packet of the one or more baseband packets.

19. The method of claim 18, wherein the Bluetooth protocol utilizes the L2CAP to provide SAR when the packet size is larger than a maximum transmission unit of each baseband packet of the one or more baseband packets.

20. The method of claim 19, wherein the one or more baseband packet is capable of being transmitted from the host to the HID and from the HID to the host.

21. The method of claim 20, wherein upon transmission from the host to the HID, the HID is capable of recognizing any among a timeout, a data signal, or a stall signal.

22. The method of claim 21, wherein upon transmission from the HID to the host, the host is capable of recognizing any among the timeout, an acknowledgement signal, a non-acknowledgement signal, or the stall signal.

23. A system for communication between a host device and a Human Interface Device (HID) comprising:
   a peripheral device to encode data and the host device to decode data under an HID protocol to form a Universal Serial Bus (USB) packet;
   wherein:
      the USB packet is encoded using a Bluetooth protocol to form a Bluetooth packet for the transmission between the host device and the peripheral device by adding a transaction header to the USB packet so that the USB packet is included as payload in the Bluetooth packet;
      a channel identifier (CID) is used to identify each endpoint of one or more endpoints associated to the peripheral device;
      the Bluetooth protocol utilizes a logical link control and adaptation protocol (L2CAP) to provide segmentation and reassembly (SAR).

24. The system of claim 23, wherein the Bluetooth packet is encapsulated into a L2CAP packet of a packet size in preparation for conversion to the one or more baseband packets for Bluetooth transmission.

25. The system of claim 24, wherein the Bluetooth protocol utilizes the L2CAP to provide SAR when the packet size is larger than a maximum transmission unit of each baseband packet of the one or more baseband packets.

* * * * *